US012718474B1

(12) United States Patent
Feng et al.

(10) Patent No.: US 12,718,474 B1
(45) Date of Patent: Aug. 25, 2026

(54) MOTION DETECTION FOR OBJECT SCANNING

(71) Applicant: Apple Inc., Cupertino, CA (US)

(72) Inventors: Shuo Feng, San Jose, CA (US); Cheng Lu, Daly City, CA (US); Onur C. Hamsici, Kilchberg (CH); Thorsten Gernoth, San Francisco, CA (US)

(73) Assignee: Apple Inc., Cupertino, CA (US)

(*) Notice: Subject to any disclaimer, the term of this patent is extended or adjusted under 35 U.S.C. 154(b) by 347 days.

(21) Appl. No.: 18/201,481

(22) Filed: May 24, 2023

Related U.S. Application Data

(60) Provisional application No. 63/348,742, filed on Jun. 3, 2022.

(51) Int. Cl.

| | |
|---|---|
| ***G06T 17/00*** | (2006.01) |
| ***G06T 7/20*** | (2017.01) |
| ***G06T 7/50*** | (2017.01) |
| ***G06T 7/70*** | (2017.01) |

(52) U.S. Cl.
CPC ................ *G06T 17/00* (2013.01); *G06T 7/20* (2013.01); *G06T 7/50* (2017.01); *G06T 7/70* (2017.01)

(58) Field of Classification Search
CPC ....... G01B 11/245; G01S 17/42; G01S 17/89; G02B 30/00; G02B 30/10; G06F 16/444; G06F 3/04815; G06T 15/00; G06T 17/00; G06T 19/00; G06T 19/20; G06T 2200/04; G06T 2200/08; G06T 7/20; G06T 7/50; G06T 7/55; G06T 7/70; G06T 7/80; G06V 20/64; H04N 13/00; H04N 13/10; H04N 13/106; H04N 13/122; H04N 13/128; H04N 12/254; H04N 13/279; H04N 2213/003; H04N 2213/005; H04N 2213/006; H04N 23/90
USPC .................................................. 345/319, 420
See application file for complete search history.

(56) References Cited

U.S. PATENT DOCUMENTS 11,022,432 B2 * 6/2021 Hollenbeck .......... H04N 13/254
2023/0288622 A1 * 9/2023 Sugano .................. G06V 10/54

* cited by examiner

*Primary Examiner* — Said Broome
(74) *Attorney, Agent, or Firm* — Thompson Hine LLP

(57) ABSTRACT

Various implementations detect object movement during object scanning and alter scanning processes accordingly. For example, when movement of the object being scanned is detected, the device may stop scanning (e.g., capturing shots) and wait for the object to stop moving. When the object stops moving, the device may re-localize the scanned model with the new position of the object and continue with the scanning processes.

21 Claims, 5 Drawing Sheets

400

425

437

Localize and Monitor for Motion 410a

Monitor for Static 435

Localize and Monitor for Motion 410b

405

Time

Shot Capture 420a

Shot Capture 420b

Shot 430a

Shot 430b

Shot 430c

Shot 430d

3D Model 440

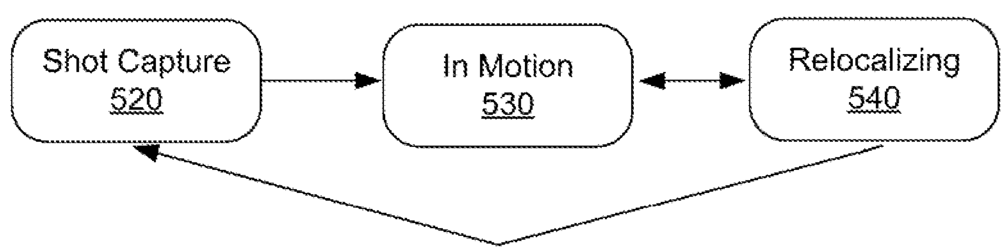
FIG. 5
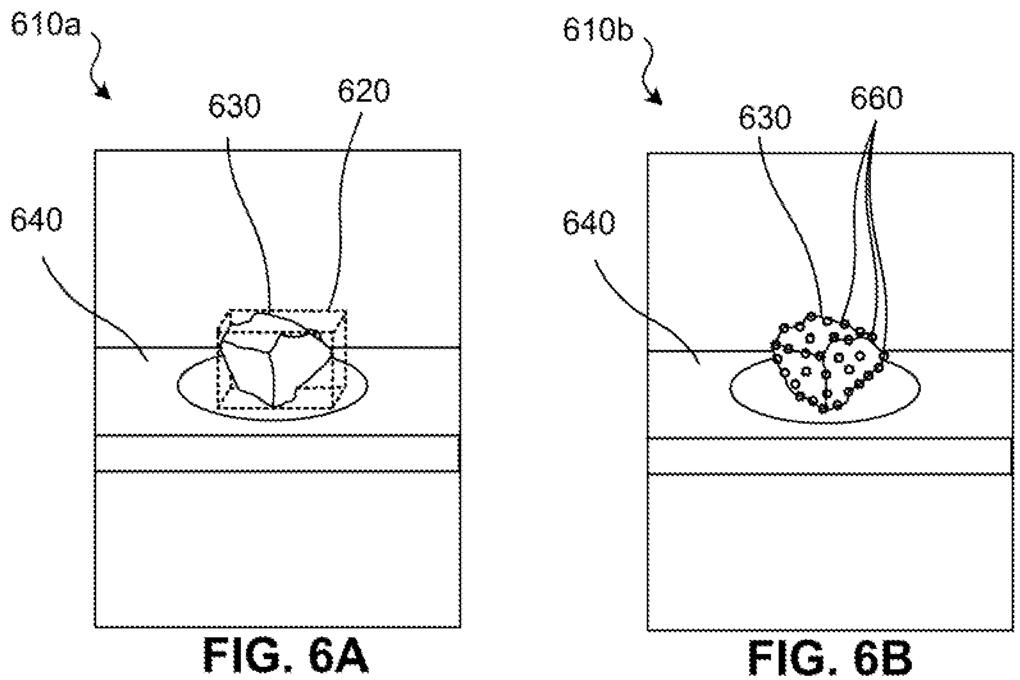
FIG. 6A
FIG. 6B
710
720
730
760
740
770
750
780
FIG. 7

FIG. 9

MOTION DETECTION FOR OBJECT SCANNING

CROSS-REFERENCE TO RELATED APPLICATIONS

This Application claims the benefit of U.S. Provisional Application Ser. No. 63/348,742 filed Jun. 3, 2022, which is incorporated herein in its entirety.

TECHNICAL FIELD

The present disclosure generally relates to electronic devices that use sensors to scan objects to generate three dimensional (3D) models.

BACKGROUND

Existing object scanning systems and techniques may be improved, for example, with respect to assessing and using the sensor data obtained during the scanning processes that are used to generate 3D models.

SUMMARY

Various implementations disclosed herein include devices, systems, and methods that detect object movement (e.g., translation or rotation) during object scanning and alter scanning processes accordingly. For example, when movement of the object being scanned is detected, the device(s) may stop scanning (e.g., capturing shots for 3D modeling) and wait for the object to stop moving. When the object stops moving, the device(s) may re-localize the scanned model with the new position of the object and continue with the scanning processes (e.g., resuming the capturing of shots for 3D modeling). The detection of object motion can reduce or eliminate the capturing of sensor data sets (e.g., shots) for the 3D model generation that may have undesirable properties, for example, data that is associated with a prior and (given the movement) potentially inaccurate localization or data that is low quality because of the movement of the object. When an object is moving, a shot may even capture only background or the object may be occluded, e.g., by the user's hand. Moreover, the detection of object motion may enable more efficient and effective use of power and processing resources, which may be particularly important on mobile devices and devices with power and resource constraints.

In some implementations, a processor performs a method by executing instructions stored on a computer readable medium. The method acquires sensor data during movement of one or more devices in a physical environment comprising an object. The sensor data comprises images of the physical environment captured via one or more cameras on one or more devices. As examples, the sensor data may include black and white or color (e.g., RGB) image data captured by a camera, lidar-based depth captured by a depth sensor, and/or densified depth provided by processing depth sensor data.

The method performs one or more processes capturing data sets from the sensor data (e.g., capturing shots) for use in generating a 3D model of the object. For example, this may involve identifying that a particular frame and/or capture location will provide useful data in generating a 3D model of the object. The capturing of such data may be based on a localization of the object's position within the environment. Such localization may provide a position of the object e.g., 6 DOF or bounding box pose, etc. The known location of the object in the physical environment may facilitate capturing data from the sensor data for use in generating the 3D model of the object. The location of the object can also facilitate an "object centric coordinate frame", where one or more algorithms may be "re-centered" with respect to this object centric coordinate frame. For example, shot locations may be "re-centered" with regard to the object centric coordinate frame, so that when the object is moved/flipped, those shots are "moved/flipped" as well (one can think as those shots are binded to the object).

The method detects a movement of the object in the physical environment. The position and orientation of the camera relative to the physical environment may have been previously determined and/or may be monitored. The movement of the object that is detected may be the result of various circumstances. For example, such a movement may occur when a user manually moves the object, e.g., rotating the object to reveal its bottom surface. The movement of the object may be detected by tracking feature positions in the image data. The tracking may be restricted to the "object area" (e.g., excluding background), as the location of the object (e.g., object transform) is available before movement detection. Detecting the movement of the object may involve tracking error (e.g., 2D projection error) of expected and actual positions of feature points. Detecting the movement of the object may involve histogram analysis or optical flow analysis.

In accordance with detecting the movement of the object, the method alters the one or more processes. For example, altering the one or more processes may involve reducing or discontinuing the capturing of data sets (e.g., shots) for use in generating the 3D model. In addition, or alternative, to reducing/discontinuing the capturing of such data sets, the method may reduce or discontinue other algorithmic modules. For example, modules providing user guidance user interface features may be reduced or discontinued since, during the movement of an object, such guidance may not be tracked or may not be able to be associated with meaningful user guidance, e.g., until the object is re-localized. While the one or more processes are altered (e.g., reduced or discontinued), the method may monitor for a stable (non-moving condition). For example, the method may continue to monitor the environment, e.g., by monitoring the center portion of the images being obtained by the camera.

In some implementations, the method is configured to enable a scanning process by alternatively operating the device in two different modes. In the first mode, given the object's known location and while no object movement is detected, the device monitors for movement of the object. This may involve tracking points or features on object, which may be based on a prior localization providing the object's location and/or abounding box corresponding to the object's location. In the second mode, after having determined that the object is moving, the device monitors for stability in the environment, which may be an indicator that the movement of the object has stopped. This may involve tracking environment points or features, e.g., those within a central region of the camera's current view.

When the method detects that some or all of the environment likely to contain the object is again static, the method may respond accordingly, e.g., by restoring the one or more processes capturing sensor data for generating the 3D model. This may involve re-localizing the object and restoring the capture processes based on the new location of the object in the physical environment. In some implementations, motion data (e.g., data indicative of the motion or stillness of the object) is used to selectively perform localization processes (which may be computationally and resource intensive) in limited circumstances (e.g., initially during a scan and only after a movement when the object is likely to have concluded). Accordingly, some implementations use object motion data to perform object (e.g., data indicative of the motion or stillness of the object) localization at select times to improve scanning efficiency and effectiveness of the scanning process.

During or after the scanning process, the method provides the data captured via the one or more processes for use in generating the 3D model of the object, which may occur after the scanning of the object has concluded and/or using additional information and/or processing resources (e.g., on a separate server).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 illustrates shot capture, motion monitoring, and re-localizing occurring cyclically during a scanning process, in accordance with some implementations.

FIGS. 6A-B illustrate a localization of an object and monitoring of features based on the localization in accordance with some implementations.

FIG. 7 illustrates monitoring features in an environment after motion of an object has been detected in accordance with some implementations.

FIG. 9 is a block diagram of an electronic device of in accordance with some implementations.

Figure 1:
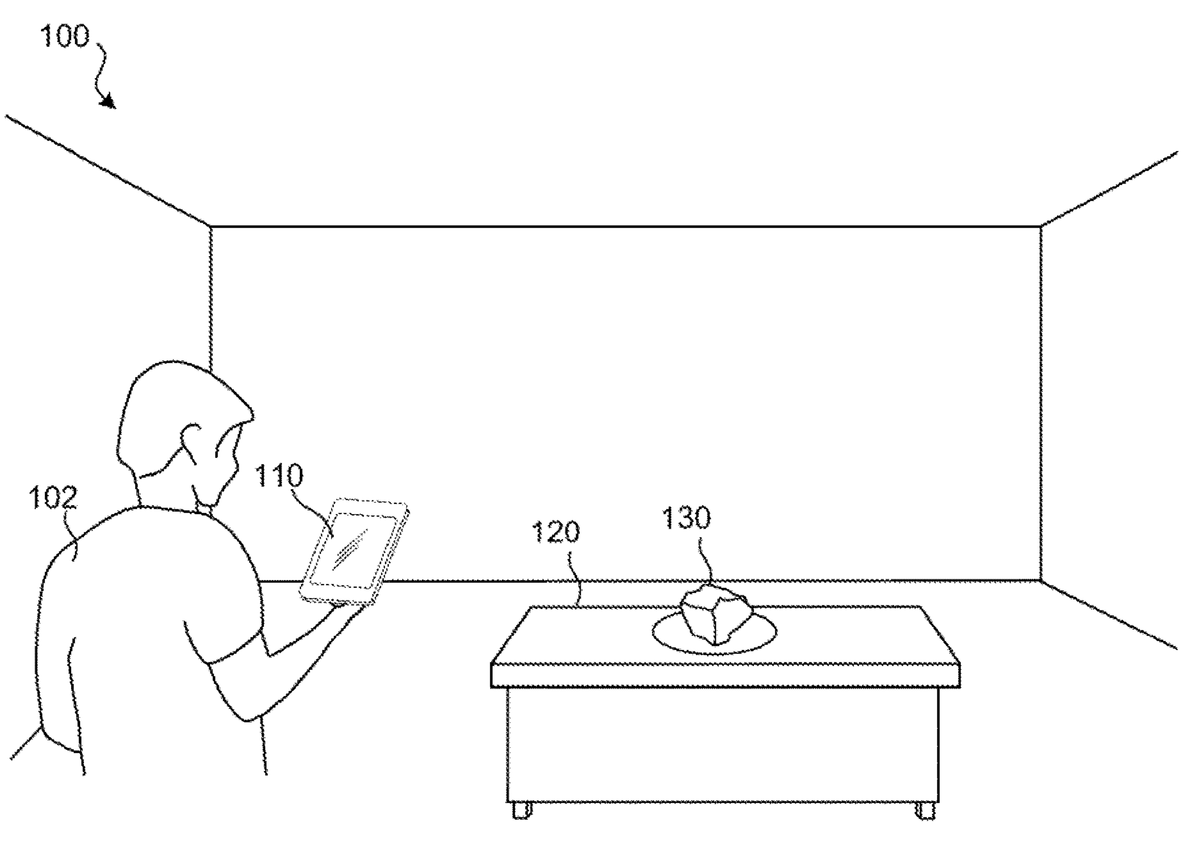
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. In this example of FIG. 1, the physical environment 100 is a room that includes a desk 120 and an object 130 to be scanned. The electronic device 110 includes one or more cameras, microphones, depth sensors, motion sensors, or other sensors that can be used to capture information about and evaluate the physical environment 100, including the object 130 to be scanned. The obtained sensor data may be used to generate a 3D model (also referred to as a 3D reconstruction) such as a 3D mesh or 3D point cloud representing the shape and appearance of the object 130.

In one example, the user 102 moves around the object 130 within the physical environment 100 and/or moves the device 110 to capture sets of sensor data (i.e., shots) from different viewpoints, e.g., at various distances, viewing angles, heights, etc. The user 102 may move the object during at least a portion of the scanning process. In another example, the object is positioned on a moving device, such as a turntable, that periodically (and not necessarily continuously) rotates the object such that the device 110 may remain still during the scanning. The captured shots are then used to generate a 3D model of the object 130. For example, the shots may include a number of RGB images and corresponding depth images with depth values corresponding to some or all of the pixels of the RGB images and these RGB and depth images may be used to generate the 3D model of the object. The shots may include other information from the time each shot is taken. For example, such information may include, but is not limited to including, image masks identifying portions of the images corresponding to the object, camera parameters (e.g., focus length, camera brand/model info, etc.), camera pose information, object pose information, object/environment feature point information, etc. Such information may be useful in providing a quality 3D model. Such information may be stored as metadata and/or in a HEIC file.

In some scanning processes, the user 102 orients the sensors of the device 110 towards the object 130 to capture the sensor data. During the object scanning process, the device's 110 camera captures images as the user moves the device 110 around the object 130 or the object 130 moves/rotates in front of the device 110. These images may be used to provide a live video view showing what is in view of the camera on a display of the device. A subset of the images may be captured for use as the shots to be used in generating the 3D model of an object.

During the scanning process, the device 110 may provide the live view video and other information to the user 102 that facilitates the scanning process. For example, the device 110 may provide a live view video from a camera showing the content of images currently being captured, e.g., a live camera feed. The user may view such video images to confirm that the object is within view of the device's 100 sensors. As another example, the device 110 may provide indications of portions of the object that have been adequately captured by previously-captured shots versus portions of the object for which more shots are desirable. Such coverage indications may be augmentations on the live camera feed or indications provided within a generated view of a live, low-resolution 3D model (which may be less complex that the final output 3D model of the scanning process).

Figure 2:
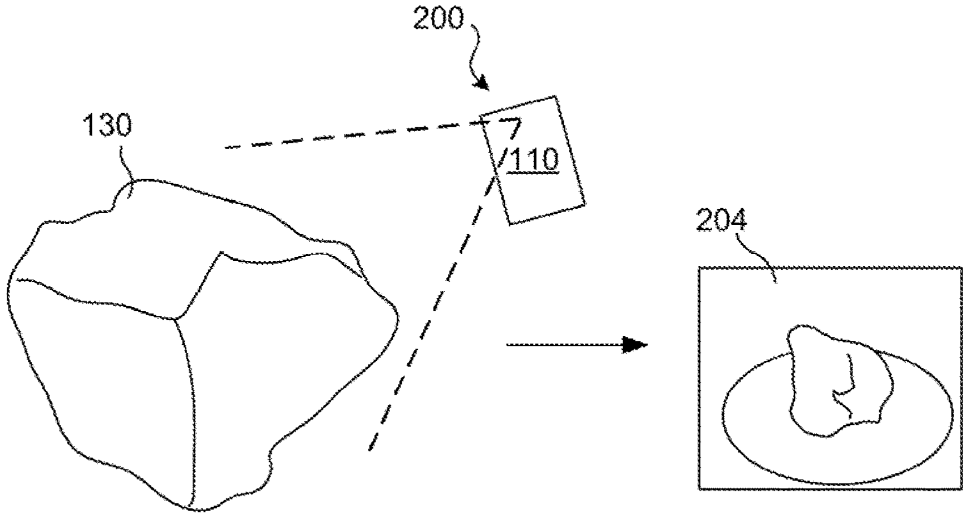
FIG. 2 illustrates image capture during a scanning process in accordance with some implementations.

FIG. 2 illustrates image capture during a scanning process. In this example, a shot 204 includes sensor data (e.g., an image) captured by the device 110. Shot 204 may include an RGB image of the object 130 from a particular viewpoint as well as corresponding depth data from depth sensor from that same viewpoint or a viewpoint at a fixed distance away from the RGB camera viewpoint. The shot 204 may include other information from the time the shot 204 is taken. For example, such information may include, but is not limited to including, an image mask identifying a portion of the image corresponding to the object 130, camera parameters (e.g., focus length, camera brand/model info, etc.), camera pose information, object pose information, object/environment feature point information, etc.

During a scanning process, as the user 102 moves the device 110 around the object 130, many shots may be captured for use in generating a 3D model of an object 130. The selection of shot camera locations may be configured to ensure that at least a minimum amount of shot data is obtained, e.g., to obtain a minimum viable amount of shot data to generate a 3D model of the object 130 satisfying a given quality/accuracy threshold. The amount of shot data obtained may depend upon the object (e.g., its relative location, object type, size, complexity, texture, etc.), the environment (e.g., lighting), and/or the expected or actual shot quality, contrast, and other characteristics (e.g., sharpness, distance from object, etc.).

The selection of when and how to capture shots (and thus the number of the obtained shots) may be selected based on an algorithm or machine learning process that is configured to make selections expected to provide a minimum number of shots to provide sufficient coverage values for all of the portions of the object 130 given the current factors or circumstances. For example, a first number of shots may be appropriate for a first circumstance while a second, different number of shots may be appropriate for a second, different circumstance. Avoiding the capture of shots that provide poor coverage or other qualities (e.g., based on detecting object movement) may improve the quality of the 3D model that is generated. In some implementations, a user interface during the scanning process may guide the user to take shots including shots according to an algorithm or machine learning process that provides shot taking guidance according to one or more criteria, e.g., to provide sufficient coverage values for all portions of the object, to minimize the number of shots, etc.

In some implementations, object movement is detected during object scanning and the scanning processes are altered accordingly. For example, when movement of the object 130 being scanned is detected, the device 110 may stop scanning (e.g., capturing shots), stop other processes (e.g., user guidance, modeling, coverage assessment, etc.) and/or monitor for the object 130 to stop moving. When the object 130 stops moving, the device 110 may re-localize the scanned model with the new position of the object 130 and continue with the scanning processes. The detection of object motion can reduce or eliminate the capturing of sensor data for the 3D model generation that may have undesirable properties, for example, data that is associated with a prior and (given the movement) potentially inaccurate localization or data that is low quality because of the movement of the object. It may avoid low quality shots that contain purely background, or that are occluded by hands or other things. Moreover, the detection of object motion may enable more efficient and effective use of power and processing resources, which may be particularly important on mobile devices and devices with power and resource constraints.

Figures 3, 4:
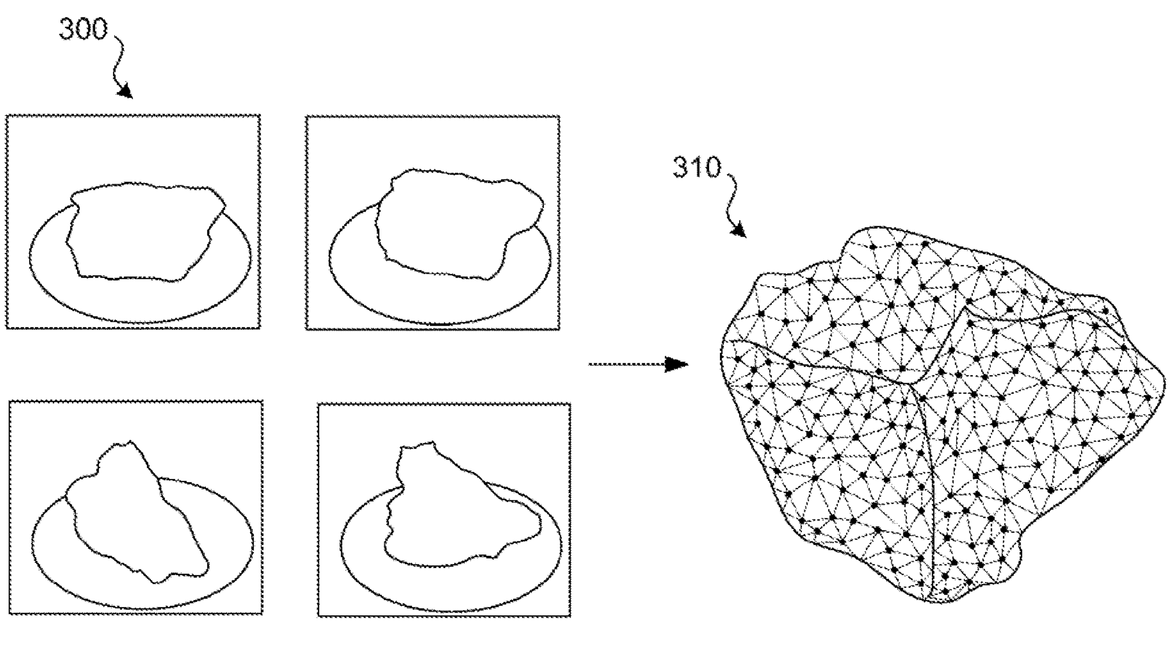
FIG. 3 illustrates utilization of shots to generate a 3D model of an object in accordance with some implementations.
FIG. 4 illustrates motion detection during a scanning process in accordance with some implementations.

FIG. 3 illustrates using a plurality of selected shots 300 (e.g., images and/or depth data sets from multiple viewpoints relative to the object 130) to generate a 3D model 310 of a scanned object 130. In this example, to simplify the illustration, four sets of sensor data 300 are shown as having been captured and used to generate the 3D model 310. In practical implementations, the number of selected sets of sensor data (i.e., shots) may include any number, from a single shot to hundreds, thousands, or more shots.

In this example, the 3D model 310 is depicted as a mesh of nodes forming triangles representing surface areas. These triangles are illustrated as relatively large areas. In practical implementations, the number of triangles may be significantly more (or less) and the triangles (or other shapes of the mesh) may be different in size, e.g., larger or smaller, than those depicted in FIG. 3. Moreover, while the 3D model 310 is illustrated as a mesh, alternative types of 3D models may be generated in other implementations, e.g., 3D point clouds, textured 3D geometries, voxel-based representations, etc. In some implementations, a 3D model includes multiple different types of representations, e.g., points, triangles, planar regions, geometric shapes, etc. A 3D model 310 may include data that identifies characteristics of the exterior of the object (e.g., color information, texture information, surface normal information, light source information, reflectivity information, opacity information, etc.), the interior of the object 130, and/or other characteristics (e.g., weight, material, semantic labels, etc.) of the object 130.

FIG. 4 illustrates motion detection and relocalization during a scanning process 400. In this example, sensor data 405 is captured during the scanning process as the user moves the device's camera and/or other sensors around the object. Initially, the sensor data 405 is used by localize and monitor for motion process 410*a* to identify a location of a scanned object. Shot capture process 420*a* also begins capturing shots. At the same time, sensor data 405 is monitored at the localize and monitor for motion process 410*a* to monitor for movement of the object. During this period, localization has already occurred and motion is not detected. In some implementations, a single localization is performed at the beginning of the localize and monitor for motion process 410*a*. However, in other implementations, localization may be performed, e.g., periodically, to confirm that the current localization is accurate. As long as there is no object movement detected, the shot capture process 420*a* continues to capture shots. In this example, shot capture process 420*a* captures shots 430*a*, 430*b* before the localize and monitor for motion process 410*a* detects a motion of the object at block 425. This detection of motion triggers discontinuing shot capture process 420*a*.

The detection further triggers monitor for static process 435, which monitors the sensor data 405 to identify evidence that the object may have stopped moving. For example, the monitor for static process 435 may monitor images of the sensor data to determine whether a portion (e.g., a center portion of each image) or all of the images include features that are static (e.g., having movement/expected position error below a threshold).

When the monitor for static process 435 determines that at least a portion of the content depicted in the image shots is stable at block 537, localize and monitor for motion process 410*b* is initiated to attempt to re-localize the object within the physical environment. If localization cannot be achieved (e.g., because the object is not in view), then the monitor for static process 435 continues. In some implementations, coaching or user guidance may be presented via a user interface asking the user to move the camera around, especially to the sides of the object which the user has scanned before. If, as shown, the localization is successful, the re-localization is used to initiate shot capture process 420*b*, which attempts to capture additional shots of the object given the object's new, known location. In some implementations, the shot capture process 420*b* may have started as soon as a static condition is detected, e.g., at the same time as or before the localization. Shots taken in this period may serve two purposes. The shots may serve as additional data to help build a more robust map to facilitate faster/more accurate re-localization. These shots may themselves also serve as "query" images to re-localize the object.

Following and/or during a localization in the localize and monitor for motion process 410*b*, the sensor data 405 is monitored to detect any new movement of the object. As long as there is no object movement detected (e.g., below a threshold amount of movement), the shot capture process 420*b* continues to capture shots. In this example, shot capture process 420*b* captures shots 430*c*, 430*d* before the localize and monitor for motion process 410*b* detects another motion of the object.

Shot capture processes can thus be periodically initiated and discontinued based on detection of periods of object motion and periods of object idleness. Once a sufficient number of shots have been captured (or the scanning process is otherwise concluded), the captured shots (e.g., shots 430*a-d*) are provided to 3D model process 440, which uses the shots to generate a 3D model of the object.

FIG. 5 illustrates shot capture, motion monitoring, and re-localizing occurring cyclically during a scanning process. In this example, a shot capture at 520 occurs until the object is detected to be in motion (as shown at 530). Once the object is no longer in motion, the re-localization at 540 occurs, providing object positioning information that can be used for addition shot capture at 520 as well as detecting object motion at 530. This new object positioning information is computed, in one implementation, via sending streaming video frames (subject to some quality selections) as query frames; or in another implementation, via starting to take shots as query frames. This iterative process may occur cyclically until sufficient object data has been obtained or the object scanning process otherwise concludes. FIG. 5 also illustrates different states of a device during a scanning process, e.g., the device may be in a shot capture state during shot capture 520, and in motion state while the object is in motion, and a (re)localization state while re-localization 540 occurs.

FIGS. 6A-B illustrate a localization of an object and monitoring of features based on the localization. In this example, sensor data is used to determine a position of an object within a physical environment. For example, this may involve identifying 3D positions of features on the object within the environment. For example, given one or more images and corresponding depth data from known camera poses (locations and orientations), the 3D positions of particular object points can be determined. In another example, such 3D positions are determined without depth sensor data, e.g., using a simultaneous localization and mapping (SLAM) technique.

After the 3D locations of features are determined, new images may be matched based on identifying the same features in the 2D content of those images. For example, this may involve, when a new image is taken, identifying where the object is in the image based on matching features of the object depicted in the image with those that are at known 3D positions within the environment. Given the positions of such features in the image and the 3D positions of such features in the environment, the camera pose (i.e., position and orientation) within the 3D environment at the time of image capture can also be determined as part of the localization.

In some implementations, given a current image content, localization can provide a position of the object's approximate boundaries (e.g., a 3D bounding box). Such a bounding box can be associated with portions of a given image, e.g., identifying which pixels of the image correspond to portions of the 3D environment that are within the bounding box. This is illustrated in FIG. 6A, which shows an image 610*a* that depicts a bounding box 620 positioned relative to the content that is depicted in the image 610*a*. The image 610*a* includes a depiction 630 of an object 130 being scanned and depictions of the surrounding environment, e.g., depiction 640 of table 140. Based on the bounding box 620, a subset of the pixels of the image 610*a* may be selected for evaluation. In this example, the bounding box 620 corresponds to the shape of the object 130 (depiction 630) and thus the subset of the pixels of the image 610*a* will correspond (mostly depending upon the accuracy of the bounding box and the closeness of other objects) to the object 130.

Such a bounding box 630 or other object positional information can be used to detect movement of the object 130 being scanned by identifying which portions (e.g., subsets of pixels) of image data to analyze to detect motion. For example, as illustrated in FIG. 6B a bounding box 620 or other location information can be used to determine which portions of an image 610*b* to analyze when assessing object movement. In this example, features 660 depicted in the image 610*b* corresponding to the object 130 are identified by identifying points that would fall within the bounding box 620 in 3D space. Note that to avoid cluttering the Figure, only a subset of the depicted features is labelled.

These identified object features 660 may be monitored for movement. For example, the actual (current) positions of these features 660 may be compared with the positions expected if the object has not moved from a prior position, e.g., based on a prior localization. Note that expected object positioning may account for device movement, e.g., where the device's position relative to the object has changed due the device having moved rather than the object having moved. For example, if the device moved an inch to the left (based on SLAM, IMU, etc.), then the expected movement of the features in sensor data (e.g., images) would have a corresponding movement (e.g., 10 pixels left) as detected by the sensor if the features/object were static. A deviation from this expected position in the sensor data may be used as an indication of motion. In other words, the device may track its own movement and account for this in determining expected object/feature movement to detect object movement. If the device detected that it moved an inch to the left but the features in the captured images moved in a way not corresponding to such a movement, then the device can determine that the expected movement does not match the detected movement and thus conclude that the object has moved. Moreover, the amount of deviation from expectation may be used to estimate an amount of object movement by taking into account the device's distance to the object, e.g., at a given distance X and an unexpected pixel shift of Y may correspond to an object movement of Z.

More movement or more error versus expectation are indicative that the object has moved. Limiting the features 660 to those in the bounding box 620 may improve the analysis of potential movement by reducing the number of (or eliminating) features that are on stable, non-moving objects in the environment. When the amount of feature movement or error associated with expected feature positions exceeds a threshold, the device or method may consider the object 130 to be in motion.

Once the object 130 is in motion, the same or a different process may be used to detect when the object motion has stops, e.g., is stable/idle again. To use the same process, object localization must be performed continuously/repeatedly during the movement, which may not be desirable or accurate in some circumstances, such as when the object or camera are moved quickly or where processing and power resources are limited. Accordingly, in some implementations, it is desirable to monitor for object motion cessation using a different technique that does not require repeated/continuous object localization.

FIG. 7 illustrates monitoring features in an environment after motion of an object has been detected. In this example, the object has been determined to be in motion and a central portion 720 of images (e.g., image 710) is then monitored. The central portion may be a percentage of the total image area (e.g., 10%, 20%, 20%, 40%, 50%, etc.) and may be determined based on the size of the object in images earlier in the scanning process. Using a central portion of the images may be advantageous since it may be more likely to depict the object than other portions of the images. Moreover, using such a portion does not require localization of the object. Using a portion of less than all of the image may also be advantageous as is reduces the chance that environmental movement separate from the object will prevent the detection of object motion stop/stability.

In this example, the image 710 includes a depiction 730 of the object 130, a depiction 750 of the plate, and a depiction 740 of the table 140. Features are identified for the entire center portion 720 and thus include features 760 corresponding to the depiction 730 of the object, features 770 corresponding to the depiction 740 of the table, and features 780 corresponding to the depiction 750 of the plate. Stability of the object can be predicted when all of the features 760, 770, 780 exhibit stable behavior without having to determine which features correspond to the object or not. If the object is moving, then at least some of the features will not exhibit stability. Once the features have movement/expected position error that are less than a threshold, the system can attempt to localize the object and/or resume shot capture processes.

Figure 8:
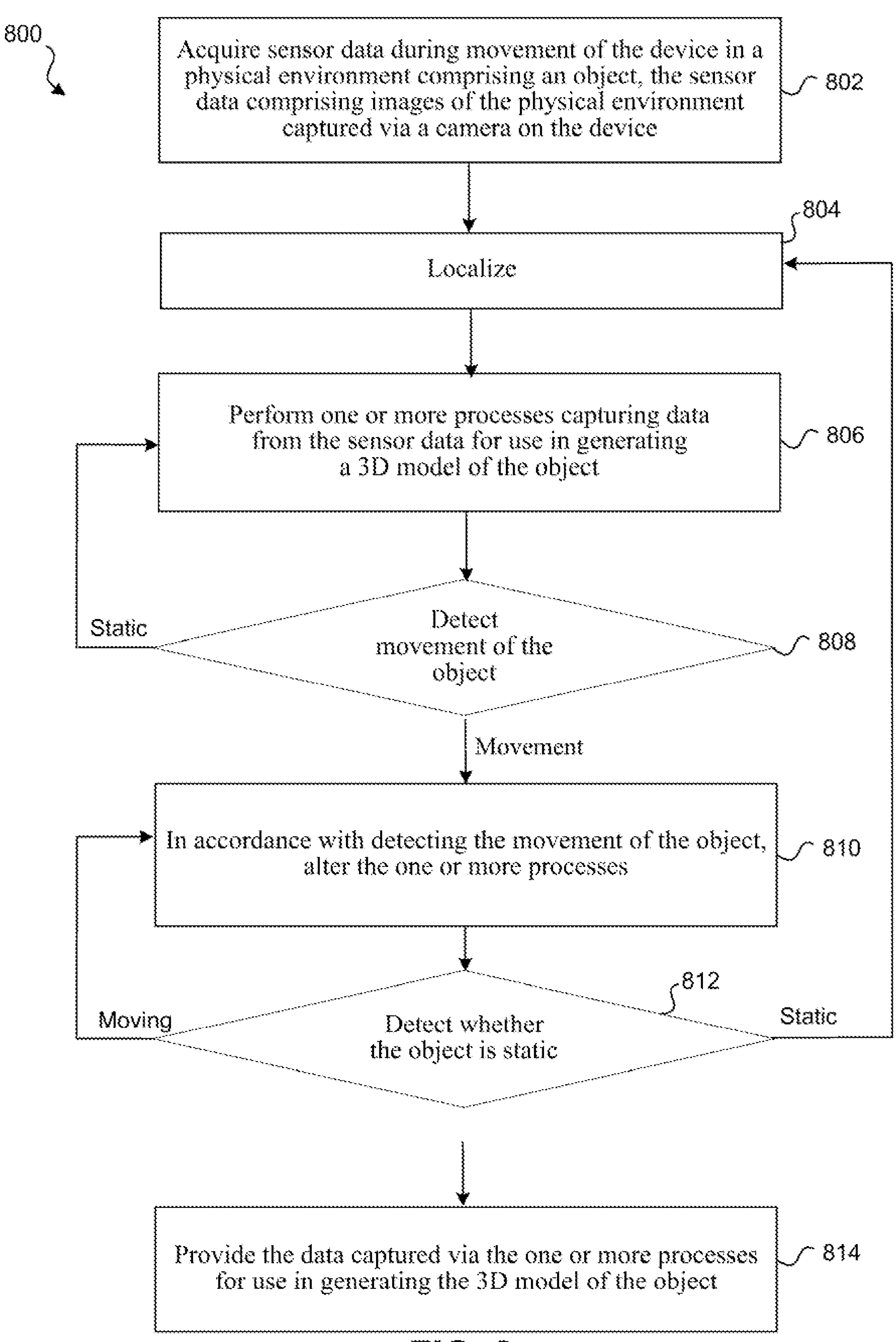
FIG. 8 is a flowchart illustrating a method of scanning an object based on detected motion in accordance with some implementations.

FIG. 8 is a flowchart illustrating a method 800 for scanning an object based on detected motion. In some implementations, a device such as electronic device 110 performs method 800. In some implementations, method 800 is performed on a mobile device, desktop, laptop, HMD, or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 acquires sensor data during movement of the device in a physical environment. The sensor data comprises images of the physical environment captured via a camera (e.g., at least one camera) on the device. The sensor data may include RGB images, black and white images, grey-scale images, depth sensor data (e.g., LIDAR, time-of-flight, etc.), depth sensor images (e.g., depth data correlated with pixel positions), densified depth data, device movement data (e.g., accelerometer data, gyroscope data, etc.), ambient light sensor data, and/or any other type of sensor data useful in generating a 3D model.

At block 804, the method 800 localizes. For example, the acquired sensor data may be used to perform a localization, identifying a location of the device relative to an object and/or within the physical environment.

At block 806, the method 800 performs one or more processes capturing data from the sensor data (e.g., capturing shots) for use in generating a 3D model of the object. The one or more processes capturing data may involve capturing one or more shots at one or more different points in time and/or from one or more different positions relative to the object. The one or more processes capturing data may be provided based on a localization providing a position of the object within the physical environment. Such a localization may provide a position of an object e.g., a 6 degree of freedom (DOF) position or bounding box pose (e.g., position and orientation) of the object.

At block 808, the method 800 detects movement of the object in the physical environment. For example, such a movement may be the result of a user altering a position or orientation of the object within the physical environment. Such a movement may be caused by a user picking up and/or rotating the object to reveal its bottom surface. Detecting the movement of the object may be based on tracking feature positions in consecutive frames of the images and/or relative to 3D feature locations given a localization. The movement may be detected by tracking feature positions in the image data, e.g., for 2, 3, 4 or more frames of image data. Detecting the movement of the object may be based on tracking 2D projection errors of expected positions versus actual positions of feature points in consecutive frames of the images. Such expected positions may be based on tracking device movement and determining expected changes in sensor data based on the device movement and a static object. The movement may be detected based on histogram analysis or optical flow analysis of feature position data.

As long as no movement is detected, the method 800 returns to block 806 to continue performing the one or more processes capturing data from the sensor data for use in generating the 3D model of the object. If movement is detected at block 806, the method proceeds to block 810.

At block 810, the method 800, in accordance with detecting the movement of the object, alters the one or more processes. Altering the one or more processes may involve reducing or discontinuing processes used to capture data sets for use in generating the 3D model. For example, altering the one or more processes may involve reducing or discontinuing shot capture processes, e.g., capturing shots for use in generating the 3D model. Altering the one or more processes may involve discontinuing user guidance, etc.

At block 812, the method 800 detects whether the object is static. Thus, during the movement of the object, the method 800 may monitor the sensor data to detect a static condition. The object may become static after having been repositioned and then set down on a surface. The method 800 may monitor the environment or the portion of the environment the device is directed towards (e.g., the center portion of the images in the acquired sensor data). The method 800 may detect a static condition based on detecting that an amount of feature point motion of features within a central area of the images is below a threshold (e.g., the portions of the environment within a central region of the images appears to be static). Detecting that the object is static may involve detecting that the object has been static for at least a threshold amount of time.

As long as the object is moving (or not static for at least a threshold amount of time), the method 800 returns to block 810. If the method detects that the object is static at block 810, the method proceeds to block 812 (e.g., not capturing shots or capturing shots at a reduced rate). When the method 800 detects that the object (or portion of the environment) is again static, the method 800 may respond accordingly. For example, the method 800 may return to block 804 to re-localize the object and restore previously-discontinued shot capture processes. Thus, based on detecting a static condition, the method may attempt to re-localize the object and, based on the object being re-localized, restore the one or more processes to a pre-alteration state to capture frame-based data sets from the sensor data for use in generating a 3D model of the object.

In some implementations, the method 800 causes a device to operate in a first mode when the object is static and in a second mode when the object is moving. For example, in a first mode, based on a prior localization of the object and a prior determination of a static condition of the object, sensor data corresponding to a location of the object (e.g., within a bounding box) is monitored to detect motion of the object. In a second mode, based on a prior determination of a moving condition of the object, sensor data corresponding to a central region of a view of the camera is monitored to detect stability within a portion of the environment corresponding to the central region of the view of the camera.

At block 814 (which may occur at the conclusion of the scanning process illustrated in blocks 802-812), the method 800 provides the data captured via the one or more processes for use in generating the 3D model of the object. Captured shot data may be provided and used to generate the 3D model. In some implementations, a 3D model is generated by imputing shot data (e.g., RGB images, black and white images, grey-scale images, depth sensor data (e.g., LIDAR, time-of-flight, etc.), depth sensor images (e.g., depth data correlated with pixel positions), densified depth data, device movement data (e.g., accelerometer data, gyroscope data, etc.), ambient light sensor data, and/or any other type of sensor data as input to a 3D model generation process (e.g., a machine learning process) to output a 3D model.

Example Device Configuration

Figure 9:
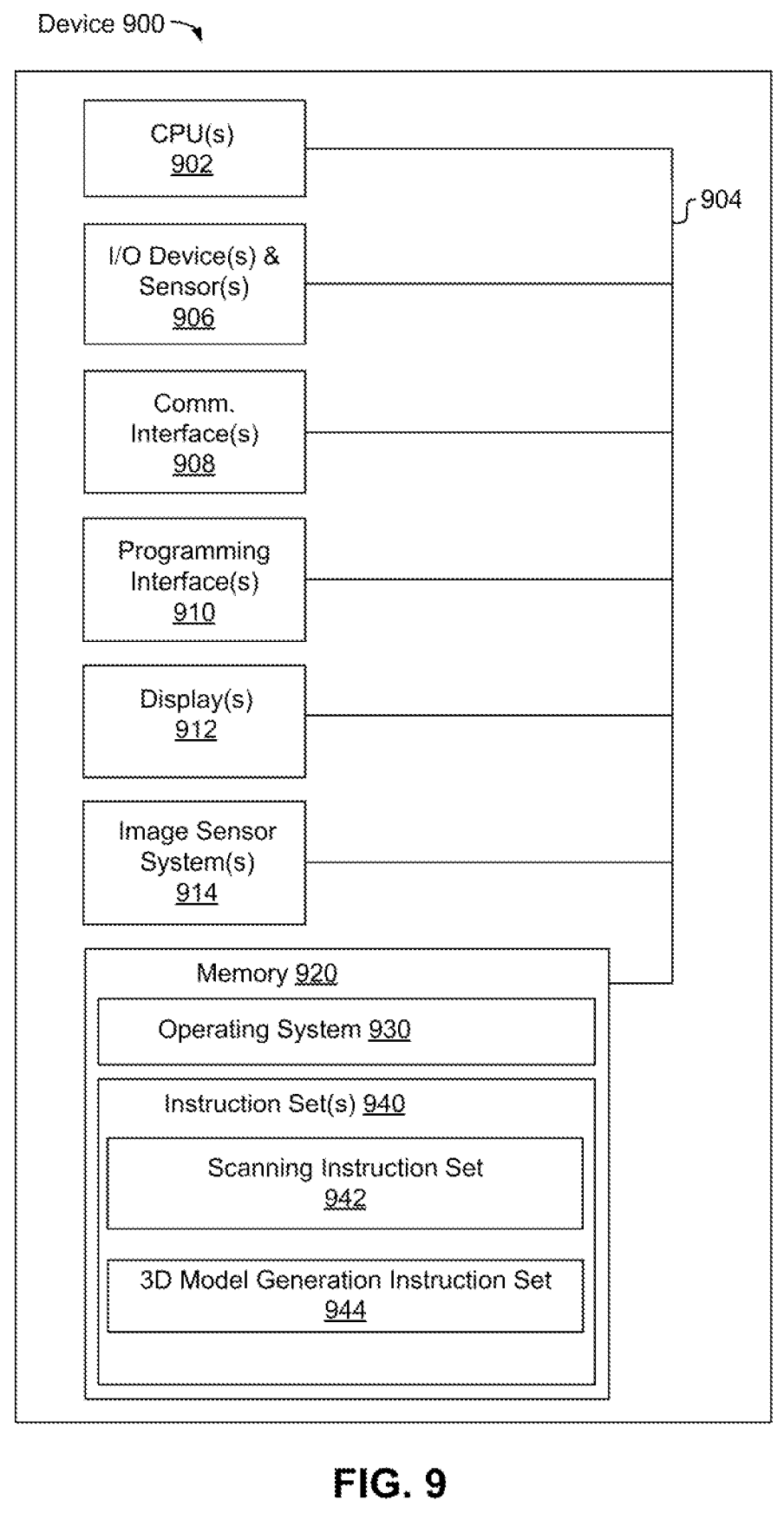

FIG. 9 is a block diagram of electronic device 900. Device 900 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more output device(s) 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 912 include one or more displays configured to present a view of a 3D environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 900 includes a single display. In another example, the device 900 includes a display for each eye of the user.

In some implementations, the one or more output device(s) 912 include one or more audio producing devices. In some implementations, the one or more output device(s) 912 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 912 may additionally or alternatively be configured to generate haptics.

In some implementations, the one or more image sensor systems 914 are configured to obtain image data that corresponds to at least a portion of a physical environment. For example, the one or more image sensor systems 914 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a scanning instruction set 942 configured to, upon execution, obtain sensor data, provide views/representations, provide feedback, alter processes based on detecting motion, and/or select shots (e.g., sets of sensor data) as described herein. The instruction set(s) 940 further include a 3D model generation instruction set 944 configured to, upon execution, generate 3D models as described herein. The instruction set(s) 940 may be embodied as a single software executable or multiple software executables.

Although the instruction set(s) 940 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a device having a processor:

performing a process obtaining sensor data for use in generating a 3D model of an object, wherein the sensor data is acquired during movement of the device in a physical environment comprising the object, the sensor data comprising images of the physical environment captured via a camera on the device;

detecting a movement of the object in the physical environment during the process;

in accordance with detecting the movement of the object, altering the process to reduce the obtaining of the sensor data for use in generating the 3D model, wherein altering the process comprises slowing a rate of obtaining the sensor data or discontinuing the obtaining of the sensor data; and providing the sensor data for use in generating the 3D model of the object.

2. The method of claim 1, wherein altering the process comprises reducing or discontinuing capturing of frame-based data sets for use in generating the 3D model.

3. The method of claim 1 further comprising, during the movement of the object, monitoring the sensor data to detect a static condition.

4. The method of claim 3, wherein the static condition is detected based on detecting that an amount of feature point motion of features within a central area of the images is below a threshold.

5. The method of claim 1 further comprising, based on detecting a static condition:

attempting to re-localize the object; and based on the object being re-localized, restoring the process to a pre-alteration state to capture frame-based data sets from the sensor data for use in generating a 3D model of the object.

6. The method of claim 1, wherein the device is configured to operate in a first mode when the object is static and in a second mode when the object is moving.

7. The method of claim 6, wherein:

in the first mode, based on a prior localization of the object and a prior determination of a static condition of the object, sensor data corresponding to a location of the object is monitored to detect motion of the object; and in the second mode, based on a prior determination of a moving condition of the object, sensor data corresponding to a central region of a view of the camera is monitored to detect stability within a portion of the environment corresponding to the central region of the view of the camera.

8. The method of claim 1, wherein the movement of the object is a movement caused by a user altering a position or orientation of the object within the physical environment.

9. The method of claim 1, wherein detecting the movement of the object comprises tracking feature positions in consecutive frames of the images.

10. The method of claim 1, wherein detecting the movement of the object comprises tracking 2D projection errors of expected positions versus actual positions of feature points in consecutive frames of the images.

11. The method of claim 1, wherein detecting the movement is based on an optical flow analysis of the image data.

12. The method of claim 1, wherein the process are performed based on a localization providing a position of the object in the physical environment, the localization providing a 6 degree of freedom position of the object or a bounding box position and orientation corresponding to the object.

13. The method of claim 1, wherein the sensor data comprises light intensity data from the camera and depth sensor data from a depth sensor.

14. The method of claim 1 further comprising generating the 3D model of the object based on the data captured via the one or more processes.

15. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

performing a process obtaining sensor data for use in generating a 3D model of an object, wherein the sensor data is acquired during movement of the device in a physical environment comprising the object, the sensor data comprising images of the physical environment captured via a camera on the device;

detecting a movement of the object in the physical environment during the process;

in accordance with detecting the movement of the object, altering the process to reduce the obtaining of the sensor data for use in generating the 3D model, wherein altering the process comprises slowing a rate of obtaining the sensor data or discontinuing the obtaining of the sensor data; and providing the sensor data for use in generating the 3D model of the object.

16. The system of claim 15, wherein altering the process comprises reducing or discontinuing capturing of frame-based data sets for use in generating the 3D model.

17. The system of claim 15, wherein the operations further comprise, during the movement of the object, monitoring the sensor data to detect a static condition.

18. The system of claim 17, wherein the static condition is detected based on detecting that an amount of feature point motion of features within a central area of the images is below a threshold.

19. The system of claim 15, wherein the operations further comprise, based on detecting a static condition:

attempting to re-localize the object; and based on the object being re-localized, restoring the one or more processes to a pre-alteration state to capture frame-based data sets from the sensor data for use in generating a 3D model of the object.

20. A non-transitory computer-readable storage medium storing program instructions executable via one or more processors to perform operations comprising:

performing a process obtaining sensor data for use in generating a 3D model of an object, wherein the sensor data is acquired during movement of the device in a physical environment comprising the object, the sensor data comprising images of the physical environment captured via a camera on the device;

detecting a movement of the object in the physical environment during the process;

in accordance with detecting the movement of the object, altering the process to reduce the obtaining of the sensor data for use in generating the 3D model, wherein altering the process comprises slowing a rate of obtaining the sensor data or discontinuing the obtaining of the sensor data; and providing the sensor data for use in generating the 3D model of the object.

21. A method comprising:

at a device having a processor:

performing a process obtaining sensor data for use in generating a 3D model of an object, wherein the sensor data is acquired during movement of the device in a physical environment comprising the object, the sensor data comprising images of the physical environment captured via a camera on the device;

detecting a movement of the object in the physical environment during the process;

in accordance with detecting the movement of the object, altering the process to reduce the obtaining of the sensor data for use in generating the 3D model;

detecting that the movement of the object ceased;

in accordance with detecting that the movement of the object ceased, restoring the process to a pre-alteration state, increasing the obtaining of the sensor data for use in generating the 3D model of the object; and providing the sensor data for use in generating the 3D model of the object.

* * * * *